May 11, 1943.                G. FASSIN                2,318,844
OPTICAL INSTRUMENT
Filed Aug. 21, 1941
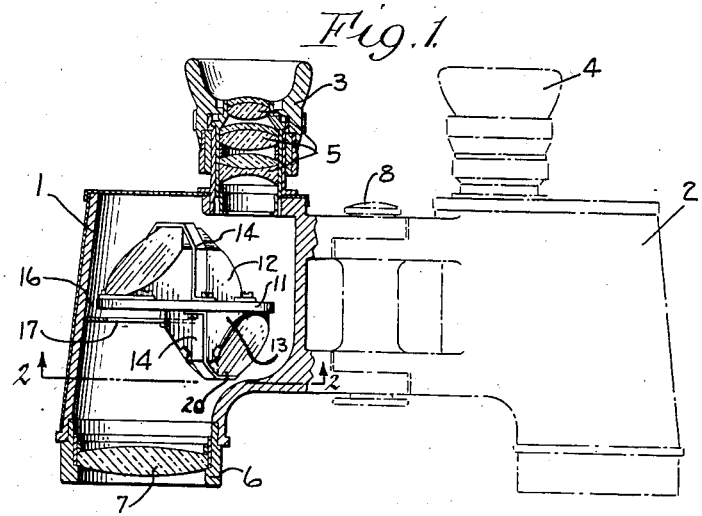
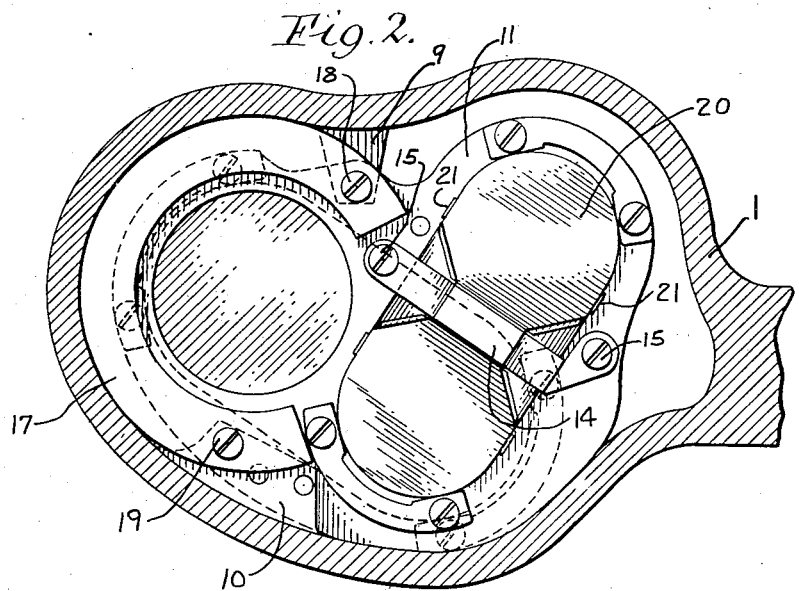
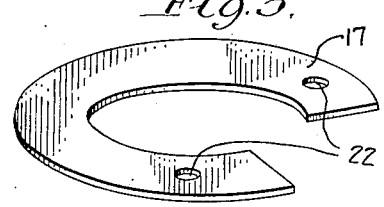
INVENTOR
GUSTAVE FASSIN
BY
*Raymond A. Paquin*
ATTORNEY Patented May 11, 1943

2,318,844

UNITED STATES PATENT OFFICE 2,318,844

OPTICAL INSTRUMENT

Gustave Fassin, Grosse Pointe, Mich., assignor to Spencer Lens Company, Buffalo, N. Y., a corporation of New York Application August 21, 1941, Serial No. 407,797

6 Claims. (Cl. 88—34)

This invention relates to optical devices and more particularly to binoculars, and has particular reference to a new and improved light shield to prevent extraneous light from being seen by the observer.

An object of the invention is to provide a new and improved shield for binoculars or the like which is simple, efficient and economical of construction.

Another object of the invention is to provide a light shield for binoculars or the like for preventing extraneous light from being seen by the observer, which shield may be easily and quickly secured in the casing.

Other objects and advantages of the invention will be apparent from the following description taken in connection with the accompanying drawing and it will be understood that many changes may be made in the details of construction and arrangement of parts without departing from the scope of the invention as expressed in the accompanying claims, as the preferred form of the invention has been shown by way of illustration only.

Referring to the drawing:

Fig. 1 is a plan view of a pair of binoculars embodying the invention and showing one of the telescopes and eyepieces thereof in section;

Fig. 2 is a sectional view on an enlarged scale taken on line 2—2 of Fig. 1 looking in the direction of the arrows; and Fig. 3 is a perspective view of one form of light shield.

While the invention is shown applied to prism binoculars, it is pointed out that the same may be employed in any optical instrument or device involving the same problem.

In the manufacture of prism binoculars and the like it is important that the device be so formed as to prevent any light from entering the casing and being seen by the observer except such light as is directed to the observer's field of view by the optical system. In the past, attempts have been made to prevent the entrance of such extraneous light by forming suitable shields integral with the inner surface of the casing which was expensive and increased the difficulties and cost of the body casting.

Another method employed was to make a cone-shaped light shield extending from the prism to the objective. Such cones were difficult and expensive to make and also the space for assembly thereof was limited, thus making the construction hard to assemble.

It is therefore one of the prime objects of the present invention to provide a light shield for preventing extraneous light from being seen by the observer but which device is simple, efficient and economical to manufacture and assemble.

Referring more particularly to the drawing wherein similar reference characters designate corresponding parts throughout the several views, the binocular shown embodying the invention comprises a pair of casing members 1 and 2 to which are secured the respective eyepieces 3 and 4 containing the lens system 5.

Adjacent the opposite end of the binocular is the cap 6 containing the objective lens 7.

The casings 1 and 2 are pivotally connected by the hinge pivot 8 which allows the distance between the casings 1 and 2 to be adjusted to the proper interpupillary distance of the observer.

The casings 1 and 2 are formed with the internal integral lugs 9 and 10. On these lugs 9 and 10 is secured the prism plate or support 11 supporting the prisms 12 and 13 by means of the straps 14 which are secured to said plate 11 by the screws 15 or the like.

By referring to Figs. 1 and 2 it will be seen that with the prism plate shown in these views the extraneous light entering the casing could pass through the space 16 between the edge of the prism support or plate 11 and the inner surface of the casing 1. If this light were allowed to pass into the portion of the casing beyond the prism support 11 and where it could be seen by the observer, it would become diffused and give a foggy image in the optical system.

To avoid the entrance of this extraneous light into the field of view of the observer, I have provided the light shield or deflector 17. This light shield 17 is preferably a flat C-shaped piece of metal or the like which is secured to the lugs or projections 9 and 10 by screws or the like 18 and 19 passing through the openings 22.

In assembling the binocular the prisms are assembled on the prism support or plate 11 and then the prisms and plate secured in the casing on the upper surface of the lugs 9 and 10 by screws or the like and the C-shaped light shield is then secured to the under surface of the projections or lugs 9 and 10 by means of the screws 18 and 19, as described above. The light shield 17 is formed of a contour similar to the end to conform to the inner surface of the casing surrounding the portion of the prism plate 11 which is in line with the objective 7. Thus any extraneous light entering through the objective 7 is prevented from passing beyond the prism plate or support 11 and being seen by the observer.

To prevent extraneous light from reaching the surface of the prism 13, the prism cover or cap 20 is provided. This cap or cover 20 is of a shape to conform to the outer surface of the prism and has a center connecting portion adapted to fit under the strap 14 which retains said cover on said prism and which cover also is provided with the lugs or projections 21 which retain said cover in an aligned position on the prism. It will be seen that by employing the construction shown and described herein that extraneous light will be prevented from being seen by the observer and that this result has been obtained by simple, efficient and economical means.

From the foregoing it will be seen that I have provided simple, efficient and economical means for obtaining all of the objects and advantages of the invention.

Having described my invention, I claim:

1. In a device of the character described, a casing, supporting means in said casing, a plate in said casing adapted to support optical elements and to be secured on said supporting means, said plate having a portion of its periphery spaced from the wall of said casing and a substantially flat light shield in said casing, said shield overlying a portion of the space between the periphery of said plate and the adjacent wall of the casing and adapted to prevent light passing between the wall of the casing and the edge of the support for the optical elements.

2. In a device of the character described, a casing, supporting means in said casing, a plate in said casing adapted to support optical elements and to be secured on said supporting means, said plate having a portion of its periphery spaced from the wall of said casing a substantially flat C-shaped light shield in said casing, said shield overlying a portion of the space between the periphery of said plate and the adjacent wall of the casing and adapted to prevent light passing between the wall of the casing and the edge of the support for the optical elements.

3. In a device of the character described, a casing, supporting lugs in said casing, a plate in said casing, openings in said plate, prism members supported on opposite sides of said plate and overlying said openings, said plate being secured on said supporting lugs and having a portion of its periphery spaced from the wall of the casing, and a substantially flat C-shaped light shield in said casing and overlying a portion of the space between said plate and the wall of said casing to prevent light passing between the wall of the casing and the edge of the prism supporting plate.

4. In a device of the character described, a casing, supporting lugs in said casing, a plate in said casing adapted to support optical elements and to be secured on said supporting lugs, a light shield in said casing overlying a portion of the periphery of said plate to prevent light passing between the wall of the casing and the edge of the support for the optical elements, and a substantially flat C-shaped light shield secured on said lugs, said plate being supported by said supporting lugs.

5. In a device of the character described, a casing, supporting lugs in said casing, a plate in said casing adapted to support optical elements and to be secured on said supporting lugs, and a light shield in said casing overlying a portion of the periphery of said plate to prevent light passing between the wall of the casing and the edge of the support for the optical elements, said light shield comprising a substantially flat strip secured adjacent its ends on said supporting lugs.

6. In a device of the character described, a casing, supporting means in said casing, a plate in said casing adapted to support optical elements and to be secured on said supporting means, said plate having a portion of its periphery spaced from the wall of said casing and a strip light shield in said casing, said shield overlying a portion of the space between the periphery of said plate and the adjacent wall of the casing and adapted to prevent light passing between the wall of the casing and the edge of the support for the optical elements.

GUSTAVE FASSIN.